US007133767B2

(12) United States Patent
Ogino et al.

(10) Patent No.: US 7,133,767 B2
(45) Date of Patent: Nov. 7, 2006

(54) METHOD AND APPARATUS FOR VEHICLE-TO-VEHICLE COMMUNICATION

(75) Inventors: Takayuki Ogino, Iwaki (JP); Satoshi Kodama, Iwaki (JP); Hitomi Okubo, Iwaki (JP); Hideki Takahashi, Iwaki (JP); Takuji Kimura, Iwanai-gun (JP)

(73) Assignee: Alpine Electronics, Inc. (JP)

( * ) Notice: Subject to any disclaimer, the term of this patent is extended or adjusted under 35 U.S.C. 154(b) by 0 days.

(21) Appl. No.: 10/671,897

(22) Filed: Sep. 26, 2003

(65) Prior Publication Data

US 2004/0128062 A1 Jul. 1, 2004

(30) Foreign Application Priority Data

Sep. 27, 2002 (JP) ............................. 2002-282192

(51) Int. Cl.
*G01C 21/20* (2006.01)
(52) U.S. Cl. ..................................... 701/200
(58) Field of Classification Search ................ 701/200, 701/300–302; 340/425.5, 463–464, 500, 340/502, 505, 10.1–10.3, 988–989, 996
See application file for complete search history.

(56) References Cited

U.S. PATENT DOCUMENTS 3,941,201 A * 3/1976 Hermann et al. ........... 180/168

4,323,210 A * 4/1982 Elder ........................... 246/26
4,823,373 A   4/1989 Takahashi et al.
5,572,201 A * 11/1996 Graham et al. ............. 340/902
6,252,519 B1* 6/2001 McKenna .................... 340/902

FOREIGN PATENT DOCUMENTS

JP         11-170887        12/1997
JP        2002-229646    *   8/2002

OTHER PUBLICATIONS

JP 2002-229646 ( copy of PTO translation).*
English language translation of abstract of Japanese Patent JP 11-170887.

* cited by examiner

Primary Examiner—Thu V. Nguyen
(74) Attorney, Agent, or Firm—Brinks Hofer Gilson & Lione

(57) ABSTRACT

The present invention relates to a method and apparatus for vehicle-to-vehicle communication between vehicles having vehicle-to-vehicle communication apparatuses. When a vehicle transmits a request, a network is formed including the vehicle that has transmitted the request and the vehicles that should respond to the request. The vehicles included in the network respond to the request or take action in response to the request.

17 Claims, 15 Drawing Sheets

<SCREEN IN VEHICLES ON HIGHWAY>

FIG. 3A

| IDLING DATA | VEHICLE ID | LOCATION | DIRECTION | REQUEST TYPE | COMMUNICATION INFORMATION |

FIG. 3B

| IDLING DATA | VEHICLE ID | LOCATION | DIRECTION | INTERRUPT REQUEST | VEHICLE TYPE, COLOR, ETC. |

FIG. 3C

| IDLING DATA | VEHICLE ID | LOCATION | DIRECTION | INTERRUPT ACKNOWLEDGMENT | VEHICLE TYPE, COLOR, ETC. |

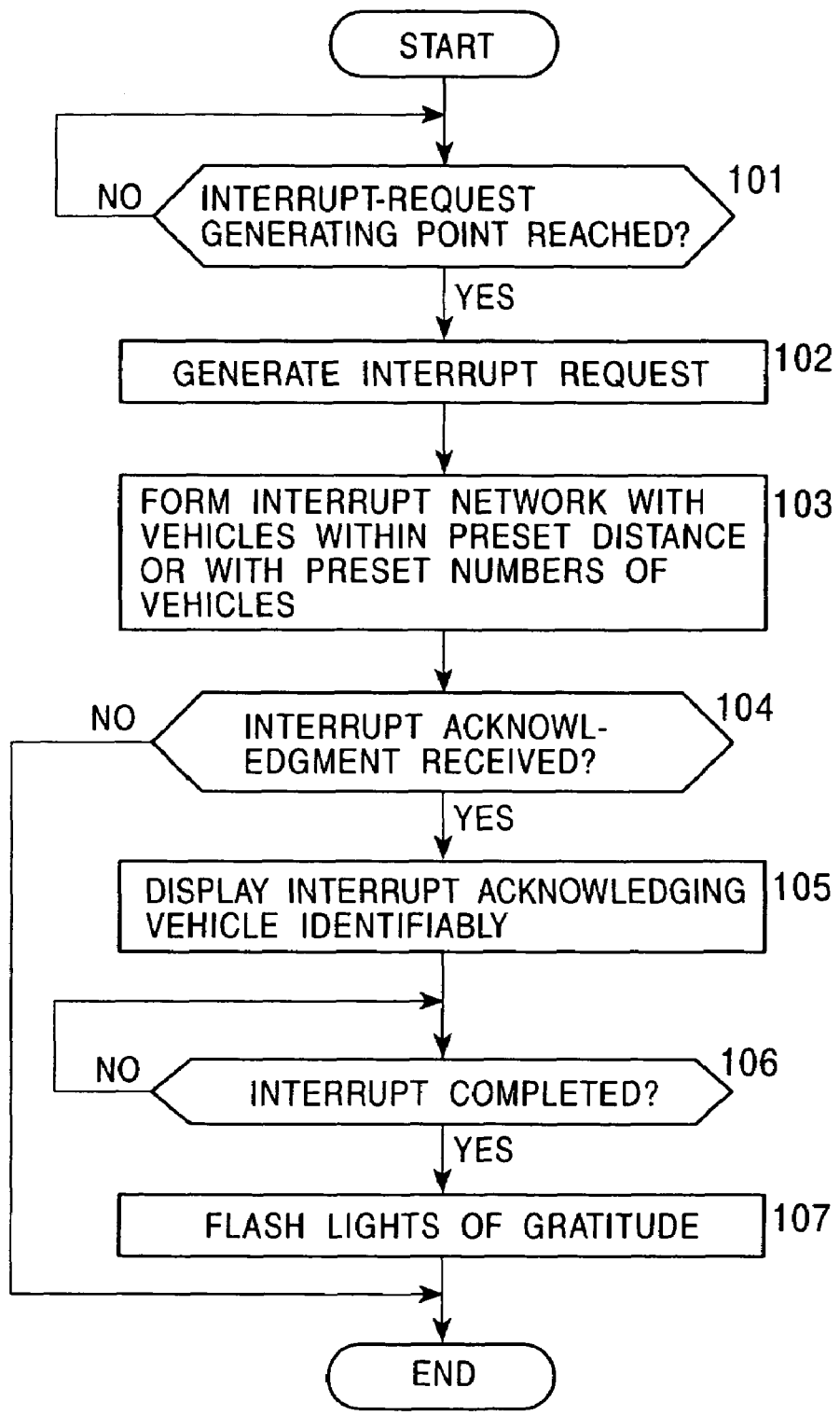

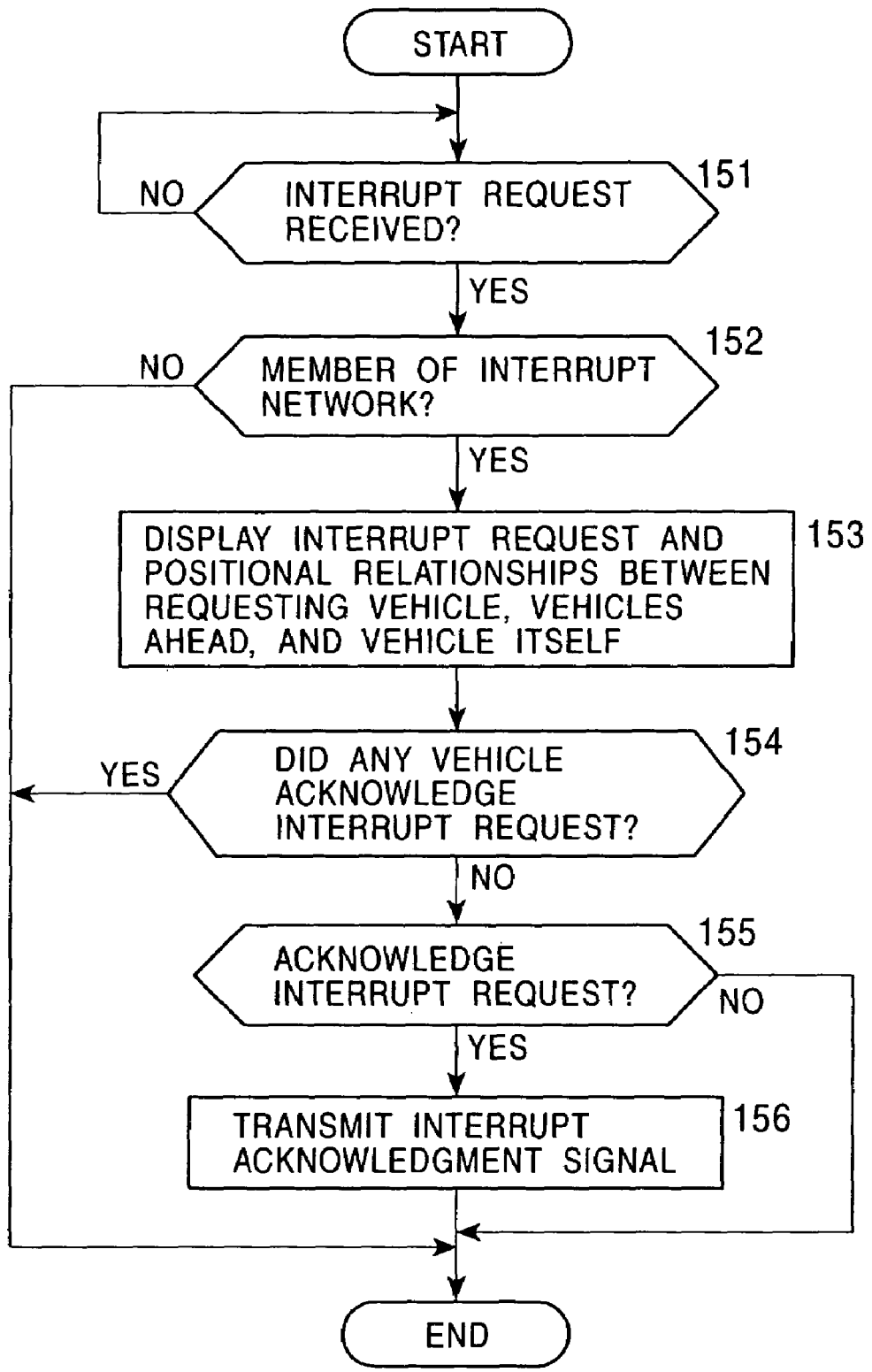

METHOD AND APPARATUS FOR VEHICLE-TO-VEHICLE COMMUNICATION

BACKGROUND OF THE INVENTION

1. Field of the Invention

The present invention relates to a vehicle-to-vehicle communication method and apparatus, and particularly to a vehicle-to-vehicle communication method and apparatus where a vehicle in a network issues a request to which another vehicle in the network responds and, if necessary, takes action according to the request.

2. Description of the Related Art

Conventional methods for asking other drivers to do something include blowing the horn, raising a hand, nodding the head, flashing the headlights, and blowing a siren.

For example, a first driver on a secondary road who wishes to squeeze into a line of vehicles on a busy highway typically uses body language such as raising a hand and nodding the head. A second driver may operate instrument switches such as flashing the headlights to permit the first driver to squeeze in front of the second driver. Unfortunately, making a request to squeeze in front of another vehicle by raising a hand is not always successful because the driver expected to respond to the request may not notice the raised hand. Obviously, this method of raising a hand does not work in an alley with walls on both sides. Furthermore, a first driver who wishes to squeeze in front of a second driver on a busy highway may cause a collision with the vehicle of the second driver; this collision may occur if the first driver mistakenly thinks the second driver permitted the first driver to squeeze in front.

Japanese Unexamined Patent Application Publication No. 11-170887 discloses a method for avoiding a collision when a vehicle squeezes into a line of other vehicles. According to this method, when a first vehicle squeezes in front of a second vehicle in a line of vehicles, the second vehicle and the subsequent vehicles in the line reduce their speed, starting with the rearmost vehicle up to the second vehicle. In more detail, each of the vehicles between the second vehicle and the rearmost vehicle of the line regulates its driving speed so as to keep a predetermined distance to the vehicle behind while exchanging driving information by vehicle-to-vehicle communication.

Another typical traffic difficulty is seen in two vehicles that cannot pass by each other in a narrow road. This difficult situation occurs because a vehicle does not have any means for being informed of another vehicle coming from the far side of the narrow road or currently driving on the narrow road. This deadlock could be avoided if vehicle-to-vehicle communication were available.

Sometimes, a vehicle gets stuck in an intersection, thus blocking the traffic of other vehicles in the orthogonal road. This is caused by misjudgment of the driver, who enters the intersection expecting to pass through while the signal is green, but fails to get out of the intersection before the signal turns red due to heavy traffic. The driver could get out of the intersection if vehicle-to-vehicle communication were available to ask vehicles ahead to move slightly (several tens of cm to 1 m, for example, for each vehicle) forward to reduce the inter-vehicle distances.

Vehicle-to-vehicle communication is also helpful to emergency vehicles such as ambulances and fire engines, which conventionally use a siren to notify other regular vehicles in the vicinity that an emergency vehicle is approaching. Unfortunately, regular vehicles do not notice an emergency vehicle until it comes quite close. Furthermore, regular vehicles may find it difficult to quickly clear the way if they are driving in a busy street, thus preventing the emergency vehicle from passing smoothly, and therefore, it cannot reach its destination as soon as possible. All regular vehicles may clear the way in some cases; yet the manner of clearing the way may not be the most convenient for the emergency vehicle due to lack of means for vehicle-to-vehicle communication.

SUMMARY OF THE INVENTION

Accordingly, an object of the present invention is to ensure that a request of one driver is sent to another driver.

Another object of the present invention is to ensure natural communication among drivers, that is, a first driver on a secondary road wishing to enter a busy highway and a second driver permitting the first driver to squeeze in front of the second driver.

Another object of the present invention is to ensure that two vehicles do not meet each other in a narrow road and that vehicles can smoothly enter a narrow road from both entrances.

Another object of the present invention is to help a vehicle smoothly get through an intersection using vehicle-to-vehicle communication to ask other vehicles ahead to move forward, when the vehicle is stuck in the intersection because, for example, the signal has turned red before the vehicle can pass through the intersection, due to heavy traffic.

Another object of the present invention is to ensure smooth passage of an emergency vehicle.

One aspect of the present invention is associated with a method for vehicle-to-vehicle communication between a first vehicle and a second vehicle, each having a vehicle-to-vehicle communication apparatus. This method includes the acts of transmitting a request from the first vehicle and forming a network including the first vehicle and the second vehicle, wherein the second vehicle responds to the request or takes action in response to the request. This aspect of the present invention ensures that one vehicle transmits its request to another vehicle, which then responds to the request or takes appropriate action in response to the request.

The request may be a request to interrupt the second vehicle on a main road, if the second vehicle is located behind the interrupt point. When the second vehicle receives the interrupt request from the first vehicle, the received interrupt request and the positional relationship between the first vehicle and the second vehicle are displayed in the second vehicle. If acknowledging the interrupt request, the second vehicle automatically flashes a light immediately before the interrupt point. When the first vehicle receives the interrupt acknowledgement from the second vehicle, acknowledgement of the interrupt request and data for identifying the second vehicle are displayed in the first vehicle. In this manner, the method according to an embodiment of the present invention ensures natural communication among drivers, that is, a first driver on a secondary road wishing to enter a busy highway and a second driver permitting the first driver to safely squeeze in front of the second driver.

The request may a request to enter a narrow road when the second vehicle is also going to enter the narrow road. The request may be a request to stop entering a narrow road when the second vehicle is going to enter the narrow road from the other entrance. In this manner, a method according to another embodiment of one present invention ensures that the first vehicle and the second vehicle do not meet each other on the narrow road so that the first vehicle and the second vehicle can enter the narrow road from both entrances smoothly. This eliminates the need for providing a new wide road or for widening the narrow road.

The request may be a request to reduce the inter-vehicle distance, when the first vehicle and the second vehicle are in the same direction. In this case, the first vehicle transmits image data showing a condition of the first vehicle in an intersection together with the request, so that the second vehicle can visually confirm how the first vehicle is in trouble. In this manner, the method according to the aspect of the present invention helps the first vehicle smoothly get through the intersection using vehicle-to-vehicle communication to ask the second vehicle ahead to move forward, when the first vehicle is stuck in the intersection because, for example, the signal has turned red before the first vehicle can pass through the intersection due to heavy traffic. Thus, the method contributes to smooth traffic in an intersection, preventing a traffic jam.

The request may be a request to clear the way for an emergency vehicle. For this type of request, the second vehicle is a vehicle on a straight road and ahead of the emergency vehicle; a vehicle which is going to enter an intersection; or a vehicle which is driving through, in the same direction, the intersection together with the emergency vehicle. The second vehicle, upon receiving the request to clear the way for the emergency vehicle, instructs the driver of the second vehicle to take a predetermined action for allowing the emergency vehicle to pass, according to the distance from the second vehicle to the emergency vehicle and whether the second vehicle is on a straight road or near the intersection. In this manner, the method according to an aspect of the present invention ensures smooth passage of the emergency vehicle, so that the emergency vehicle can reach its destination as soon as possible.

BRIEF DESCRIPTION OF THE DRAWINGS

FIGS. 3A, 3B, and 3C show a data format used for vehicle-to-vehicle communication;

FIG. 4 is a flowchart for processing an interrupt request issued by an interrupt requesting vehicle;

FIG. 5 is a flowchart for processing an interrupt acknowledgement by an interrupt acknowledging vehicle;

DESCRIPTION OF THE PREFERRED EMBODIMENTS (A) Structure of a Vehicle-to-Vehicle Communication System Including a Vehicle-to-Vehicle Communication Apparatus FIG. 1 is a schematic diagram of a vehicle-to-vehicle communication system including a navigation apparatus 50 and a vehicle-to-vehicle communication apparatus 60 according to an embodiment of the present invention. The navigation apparatus 50 and the vehicle-to-vehicle communication apparatus 60, which are typically used in a vehicle, are connected such that they can communicate with each other.

Figure 1:
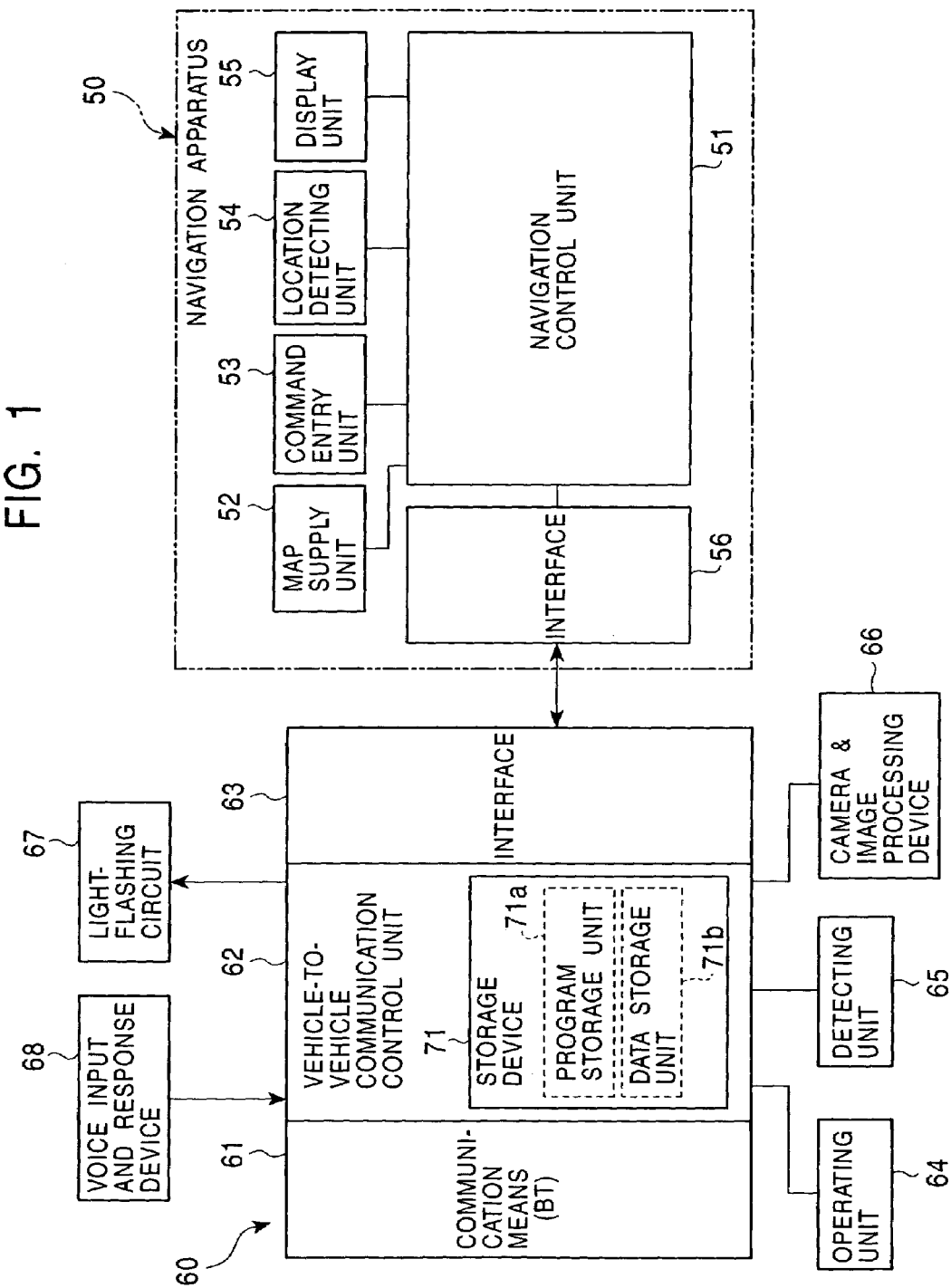
FIG. 1 is a schematic diagram of a vehicle-to-vehicle communication system including a vehicle-to-vehicle communication apparatus according to an embodiment of the present invention.

The navigation apparatus 50 includes a navigation control unit 51 that controls display of a map of the vicinity of the vehicle, searching for guidance route to a destination, and route guidance along the guidance route; a map supply unit 52 that loads necessary map data from a map storage medium into the navigation control unit 51; a command entry unit 53 for entering various commands for map display; a current-location detecting unit 54 that detects the current location of the vehicle; a display unit 55 that displays the map, the guidance route, and other data; an interface unit 56 that controls communication with the vehicle-to-vehicle communication apparatus 60; and other units.

The vehicle-to-vehicle communication apparatus 60 includes communication means for communicating with vehicles and facilities in the vicinity, such as a Bluetooth device 61 (abbreviated to BT in FIG. 1); a vehicle-to-vehicle communication control unit 62 that controls vehicle-to-vehicle communication; an interface unit 63 that controls communication with the navigation apparatus 50; an operating unit 64; a detecting unit 65; a forward-facing camera and image processing device 66; a light-flashing circuit 67 that flashes lights; a voice input and response device 68; and other units.

The vehicle-to-vehicle communication control unit 62 is provided with a storage device 71 that includes a program storage unit 71a containing various programs according to various processing flows described below and a data storage unit 71b that stores data such as settings and the results of processing.

The operating unit 64 has a car-mounted display unit, a touch panel, and operating switches (controls). The detecting unit 65 includes components such as a turn-signal on/off sensor and a vehicle speed sensor.

(B) Bluetooth

Bluetooth, which is used for vehicle-to-vehicle communication (including vehicle-to-facility communication), is a wireless link intended for replacing cables between the electronic circuits of a mobile object and a stationary object or a mobile object and a mobile object. In Bluetooth communication, a master makes an inquiry as to what types of slaves are present in the vicinity thereof by issuing an IQ packet. Each slave responds to the master by sending an FHS packet which includes its Bluetooth device address and clock information required to establish a connection. In short, the master, by making an inquiry, can acquire the device addresses and clock information of all slaves that have responded to the inquiry. The Bluetooth device address is a unique address assigned to each Bluetooth device.

Thereafter, the master performs a process called a Page using the acquired Bluetooth device address and clock information of a selected slave to establish a connection with the selected slave, thus exchanging data with the slave. In more detail, the master sends an ID packet to the selected slave, receives from the slave a message confirming that the slave has received the ID packet, and sends an FHS packet to the slave to inform the slave of the master's Bluetooth device address and clock information, thus entering the communication phase. If informed of the device address of a target slave located within a connectable range, the master can connect directly to the slave.

(C) Interrupt Request and Interrupt Acknowledgement

FIGS. 2A, 2B, 2C, 2D, and 2E illustrate how a vehicle on a secondary road 1 squeezes into (this action may be expressed as "interrupting" hereinafter) a line of vehicles on a busy highway 2. Referring to FIGS. 2A, 2B, 2C, 2D, and 2E, the vehicle wishing to squeeze in is vehicle A and a vehicle that accepts (this action may be expressed as "acknowledgement" hereinafter) the interrupt is vehicle B.

Figure 2A:
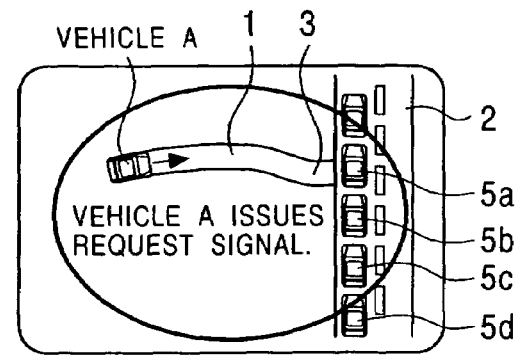
FIGS. 2A, 2B, 2C, 2D, and 2E illustrate how a vehicle on a secondary road squeezes into a line of vehicles on a busy highway.

Referring to FIG. 2A, when vehicle A driving on the secondary road 1 reaches a point 50 m away from the highway 2 (if the secondary road 1 is not busy) or when vehicle A sees only one vehicle ahead which is also going to squeeze into the line of traffic (if the secondary road 1 is busy), vehicle A automatically issues an interrupt-request signal. Vehicle A is capable of acquiring information regarding the locations of other vehicles by vehicle-to-vehicle communication, thereby identifying how busy the highway 2 is and the number of vehicles in front of it. For example, the driver of vehicle A may input information regarding the locations of the relevant vehicles into the navigation apparatus 50 (as shown in FIG. 1) to see the number of vehicles in front up to an interrupt point 3 and how busy the highway 2 is.

Figure 2B:
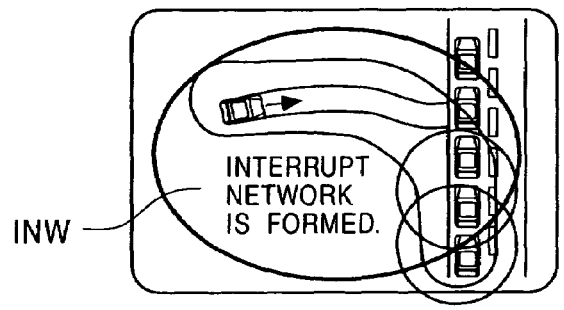

Referring now to FIGS. 2A and 2B, after vehicle A issues the request signal, an interrupt network involving vehicle A is formed with vehicles 5a, 5b, 5c, and 5d, which are located within communication range of vehicle A and which are going to pass by the relevant interrupt point 3.

Figure 2C:
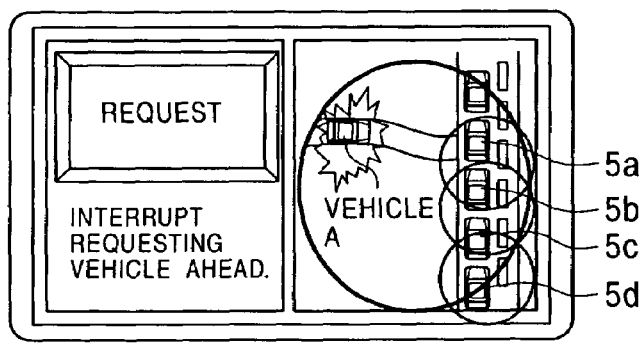

Referring to FIG. 2C, upon receiving the request signal from vehicle A, the vehicles on the highway 2 in the interrupt network inform their drivers that an interrupt request has been received, using voice guidance and a visual indication, by devices installed in the vehicles.

Figure 2D:
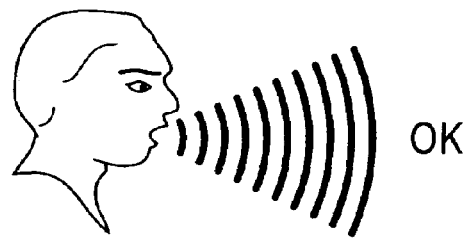

Referring to FIG. 2D, upon noticing the interrupt request from vehicle A, the drivers of the vehicles on the highway 2 respond with OK (for accepting the interrupt) or NG (for rejecting the interrupt), using voice input or by operating a switch on the car-mounted devices. In this manner, an acknowledgement response from vehicle B is issued to vehicle A via the network.

Figure 2E:
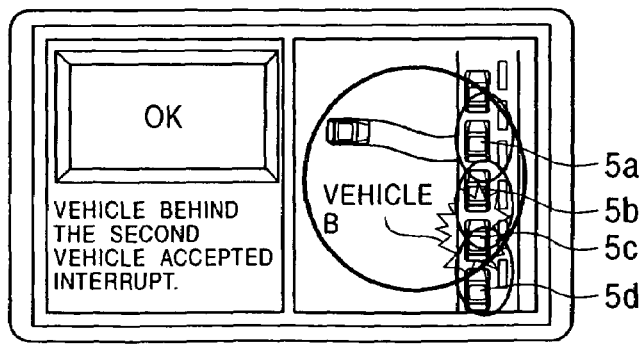

Referring now to FIG. 2E, using voice guidance of the car-mounted device, vehicle A, upon receiving the acknowledgement response from vehicle B, informs its driver that a vehicle which has accepted the interrupt is available and displays the position of vehicle B.

When vehicle B reaches the interrupt point 3 (more specifically, when vehicle B sees a sufficient space ahead at the interrupt point 3, as a result of the vehicle in front moving forward), vehicle B automatically flashes the headlights to indicate that vehicle A can squeeze in front of vehicle B.

After squeezing in front of vehicle B, vehicle A flashes the rear lights to show gratitude.

FIG. 3A shows a data format used for vehicle-to-vehicle communication. The data format includes an idling data field, a vehicle ID field, a vehicle location field, a direction field, a request type field, and a communication information field. The idling data is a synchronizing signal (preamble) for stable communication. The vehicle ID is an identifier of each vehicle provided with a vehicle-to-vehicle communication apparatus; the vehicle ID, for example, is a Bluetooth device address. The vehicle location represents the location of the vehicle that transmits data. The direction represents the direction in which the vehicle that transmits data moves. The request type indicates the type of request such as an interrupt request, a request to enter a narrow road, a request to stop entering a narrow road, a request to remove traffic obstruction, and a request to clear the way for an emergency vehicle. The communication information field represents various information associated with the request; the type, color, and other associated information of the requesting vehicle for an interrupt request, as shown in FIG. 3B, and for an interrupt acknowledgment response, as shown in FIG. 3C, for example.

FIG. 4 is a flowchart for processing an interrupt request issued by an interrupt requesting vehicle.

Referring to FIGS. 2A, 2B, 2C, 2D, 2E and 4, the vehicle-to-vehicle communication apparatus 60 (as shown in FIG. 1) of interrupt requesting vehicle A checks whether vehicle A has reached an interrupt-request signal generating point (act 101). When vehicle A reaches the interrupt-request signal generating point, the vehicle-to-vehicle communication apparatus 60 of vehicle A automatically transmits an interrupt request signal as shown in FIG. 2A (act 102).

The vehicle-to-vehicle communication apparatus 60 of vehicle A forms a network INW with vehicles 5a, 5b, 5c, and 5d, which are located within communication range of vehicle A and which have not yet passed by an interrupt point 3, as shown in FIG. 2B (act 103).

Thereafter, the vehicle-to-vehicle communication apparatus 60 of vehicle A checks whether it has received an interrupt acknowledgment signal (act 104); displays that acknowledging vehicle B is available and identifiably indicates the location, vehicle type, and color of acknowledging vehicle B on the display unit of the operating unit 64 or on the display unit 55 of the navigation apparatus 50 (as shown in FIG. 1), upon receiving an interrupt acknowledgment signal; and audibly informs that acknowledging vehicle B is available by means of an audio device, as shown in FIG. 2E (act 105).

Subsequently, the vehicle-to-vehicle communication apparatus 60 of vehicle A checks whether vehicle A has completed squeezing in front of vehicle B (act 106), and activates the light-flashing circuit 67 (as shown in FIG. 1) to flash the lights in gratitude at the completion of interrupt (act 107), thus completing the processing of the interrupt request.

FIG. 5 is a flowchart where vehicle B processes the interrupt request by vehicle A as shown in FIGS. 2A, 2B, 2C, 2D, and 2E.

Referring now to FIGS. 2A, 2B, 2C, 2D, 2E, and 5, the vehicle-to-vehicle communication apparatus 60 (as shown in FIG. 1) of vehicle B monitors whether it has received an interrupt request (act 151), and checks whether it is a member of the network INW (act 152) upon receiving an interrupt request. The vehicles on the highway 2 which have not yet passed by the interrupt point 3 are members of the network INW.

The vehicle-to-vehicle communication apparatus 60 of vehicle B, if it is a member of the network INW, informs its driver that there is an interrupt requesting vehicle and gives the driver information regarding the interrupt requesting vehicle, such as the location, color, and type, using voice guidance and a visual indication by devices installed in vehicle B, as shown in FIGS. 2C and 2D (act 153).

Thereafter, the vehicle-to-vehicle communication apparatus 60 of vehicle B checks whether any other vehicle has acknowledged the interrupt request (act 154); the vehicle-to-vehicle communication apparatus 60 of vehicle B quits the processing upon confirming that another vehicle has acknowledged the interrupt request. If no other vehicles have yet responded with an acknowledgement, the driver of vehicle B, if wishing to accept the interrupt (act 155), operates the OK key on an operating panel to transmit an interrupt acknowledgment signal to the interrupt requesting vehicle (act 156). The driver of vehicle B, if not wishing to accept the interrupt request, operates the NG key to quit the processing.

Figure 6:
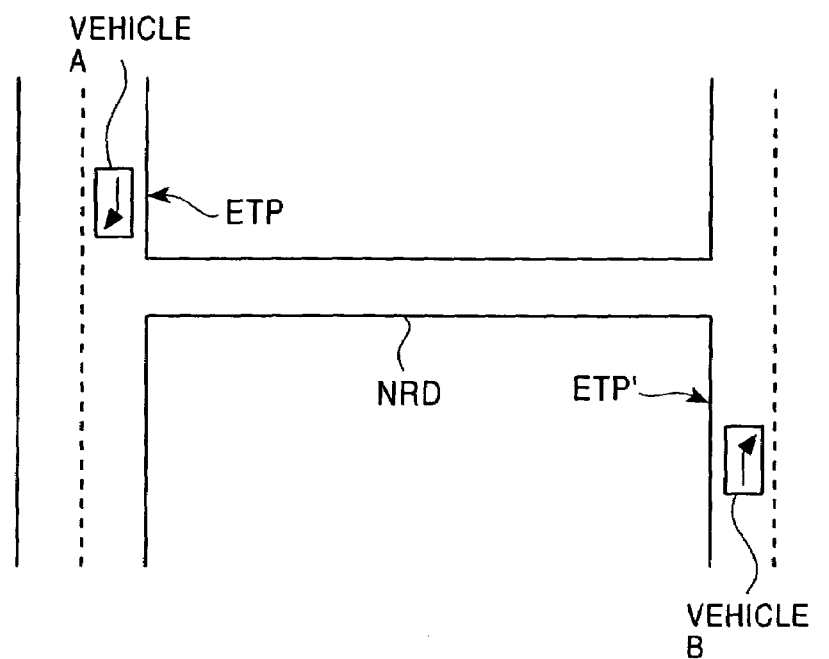
FIG. 6 is a first illustration showing how vehicles are prevented from meeting each other on a narrow road.
Figure 7:
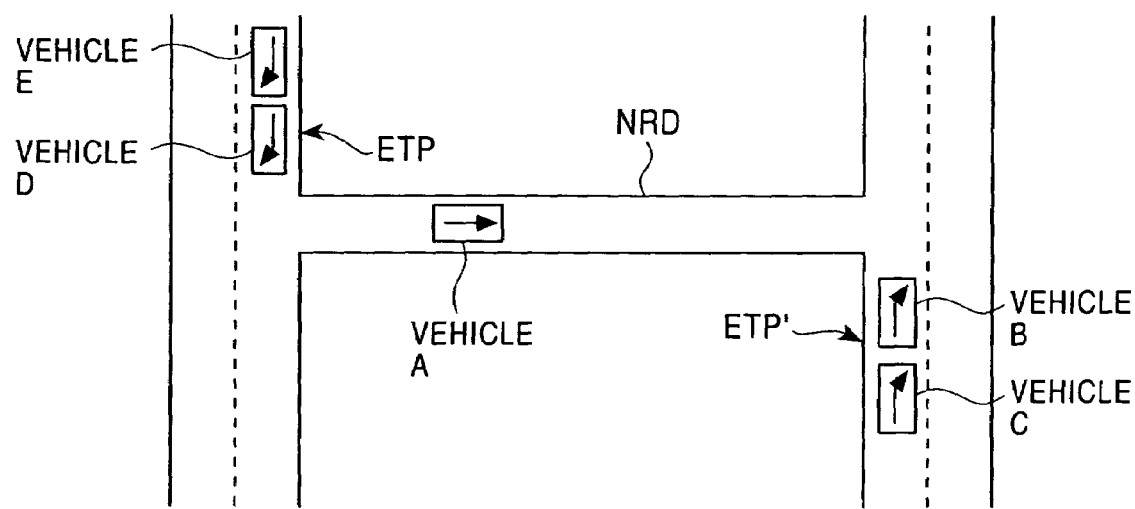
FIG. 7 is a second illustration showing how vehicles are prevented from meeting each other on a narrow road.

(D) Processing for Preventing Two Vehicles from Meeting Each Other on a Narrow Road FIGS. 6 and 7 illustrate how to prevent vehicles from meeting each other on a narrow road, assuming that the vehicles are provided with a vehicle-to-vehicle communication apparatus and a device for detecting their locations such as a GPS or a navigation apparatus. A network for preventing two vehicles from meeting each other on a narrow road involves vehicles that are moving at the same time toward a particular narrow road, such as an alley, a narrow bridge, or a partially narrowed road under construction. The communication data format used for the network for preventing two vehicles from meeting each other on a narrow road is the same as that shown in FIG. 3A.

Referring now to FIG. 6, vehicle A, upon reaching a point ETP near an entrance of a narrow road NRD that is pre-registered in map information, transmits a signal for a request to enter the narrow road. This request initiates processing for preventing two vehicles from meeting each other on the narrow road. The signal for a request to enter the narrow road may be triggered by the operation of a turn signal that indicates that the driver is going to enter the narrow road or by the navigation apparatus 50 (as shown in FIG. 1) detecting that the vehicle has reached the ETP.

Upon receiving the signal for a request to enter the narrow road, vehicle B, which is also going to enter the narrow road from the opposite entrance, may send back to requesting vehicle A such information as its own location, direction, and speed and the number of vehicles subsequent thereto. If vehicle A does not receive any response to the request to enter the narrow road, vehicle A is allowed to enter the narrow road, assuming that there are no other vehicles going to enter the narrow road. If vehicle A receives a response from vehicle B, vehicle A calculates an entry priority (using data such as the distance to the entry point, the time required to reach the point, and the number of subsequent vehicles) to determine the entry priority of vehicles A and B. Thereafter, vehicles A and B enter the narrow road according to their entry priority. Other vehicles that have arrived after vehicles A and B are required to wait at the entrances.

Referring now to FIG. 7, vehicle A, upon entering the narrow road NRD, transmits data of the vehicle location by radio communication means and automatically transmits a request to stop entering the narrow road from the opposite entrance. Vehicles in the vicinity that have received the request to stop entering the narrow road and were going to enter the narrow road from the opposite entrance form a network for stopping entry into the narrow road, thus refraining from entering the narrow road. After all vehicles assigned an entry priority have passed through the narrow road or while some of those vehicles are still moving on the narrow road, the waiting vehicles (vehicles C, D, and E) determine respective entry priorities in the same manner as described above and enter the narrow road according to their priority. If two or more vehicles wishing to enter the narrow road are given the same priority, an electronic die is rolled to determine the priority.

Figure 8:
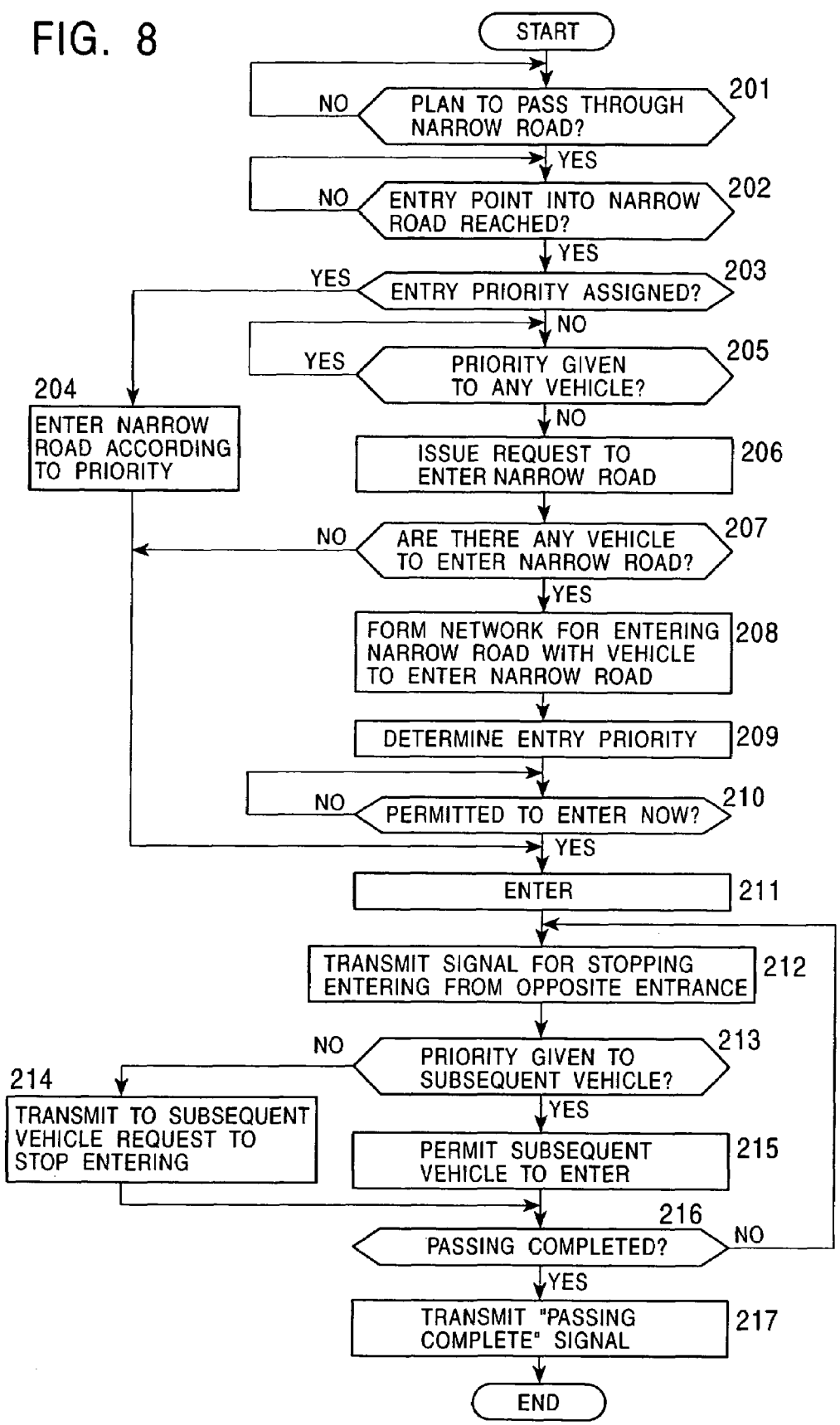
FIG. 8 a flowchart showing processing for preventing two vehicles from meeting each other on a narrow road.

FIG. 8 is a flowchart illustrating processing for preventing two vehicles from meeting each other on a narrow road.

Referring FIGS. 6, 7 and 8, the vehicle-to-vehicle communication apparatus 60 (as shown in FIG. 1) of vehicle A checks whether vehicle A is going to pass through a narrow road NRD (act 201). If vehicle A is going to enter the narrow road NRD, the vehicle-to-vehicle communication apparatus 60 of vehicle A monitors whether vehicle A has reached an entry point ETP into the narrow road NRD (act 202). When vehicle A has reached the entry point ETP into the narrow road NRD, the vehicle-to-vehicle communication apparatus 60 of vehicle A checks whether vehicle A is assigned an entry priority (act 203), and if one is assigned, vehicle A enters the narrow road NRD according to the given priority (act 204).

If vehicle A is not assigned an entry priority, the vehicle-to-vehicle communication apparatus 60 of vehicle A confirms that an entry priority is not assigned to any other vehicle (act 205), issues a request to enter the narrow road NRD (act 206), and checks for any vehicle that is going to enter the narrow road NRD (act 207). If there are no other vehicles that are going to enter the narrow road NRD, vehicle A enters the narrow road NRD (act 211).

If any other vehicles are going to enter the narrow road NRD, the vehicle-to-vehicle communication apparatus 60 of vehicle A forms with those vehicles a network for preventing two vehicles from meeting each other on the narrow road NRD (act 208) and determines the entry priorities of the those vehicles (act 209). The vehicle-to-vehicle communication apparatus 60 of vehicle A checks for the turn of vehicle A (act 210), and when it is the turn of vehicle A, vehicle A enters the narrow road NRD (act 211).

After vehicle A has entered the narrow road NRD, the vehicle-to-vehicle communication apparatus 60 of vehicle A transmits a request to stop entering the narrow road NRD from the opposite entrance (act 212) and checks whether the subsequent vehicle is given the next priority (act 213). The vehicle-to-vehicle communication apparatus 60 of vehicle A sends to the subsequent vehicle a signal for stopping entry into the narrow road NRD if the subsequent vehicle is not given the next priority (act 214), or sends to the subsequent vehicle a signal for permitting the subsequent vehicle to enter the narrow road NRD if the subsequent vehicle is given the next priority (act 215).

Thereafter, the vehicle-to-vehicle communication apparatus 60 of vehicle A checks whether vehicle A has passed through the narrow road NRD (act 216). The vehicle-to-vehicle communication apparatus 60 of vehicle A repeats act 212 and the subsequent acts until vehicle A completes passing through the narrow road NRD. The vehicle-to-vehicle communication apparatus 60 of vehicle A sends a "passing complete" signal to quit the processing when vehicle A has completed passing through the narrow road NRD (act 217).

(E) Processing for Removing Traffic Obstruction at an Intersection

Figure 9:
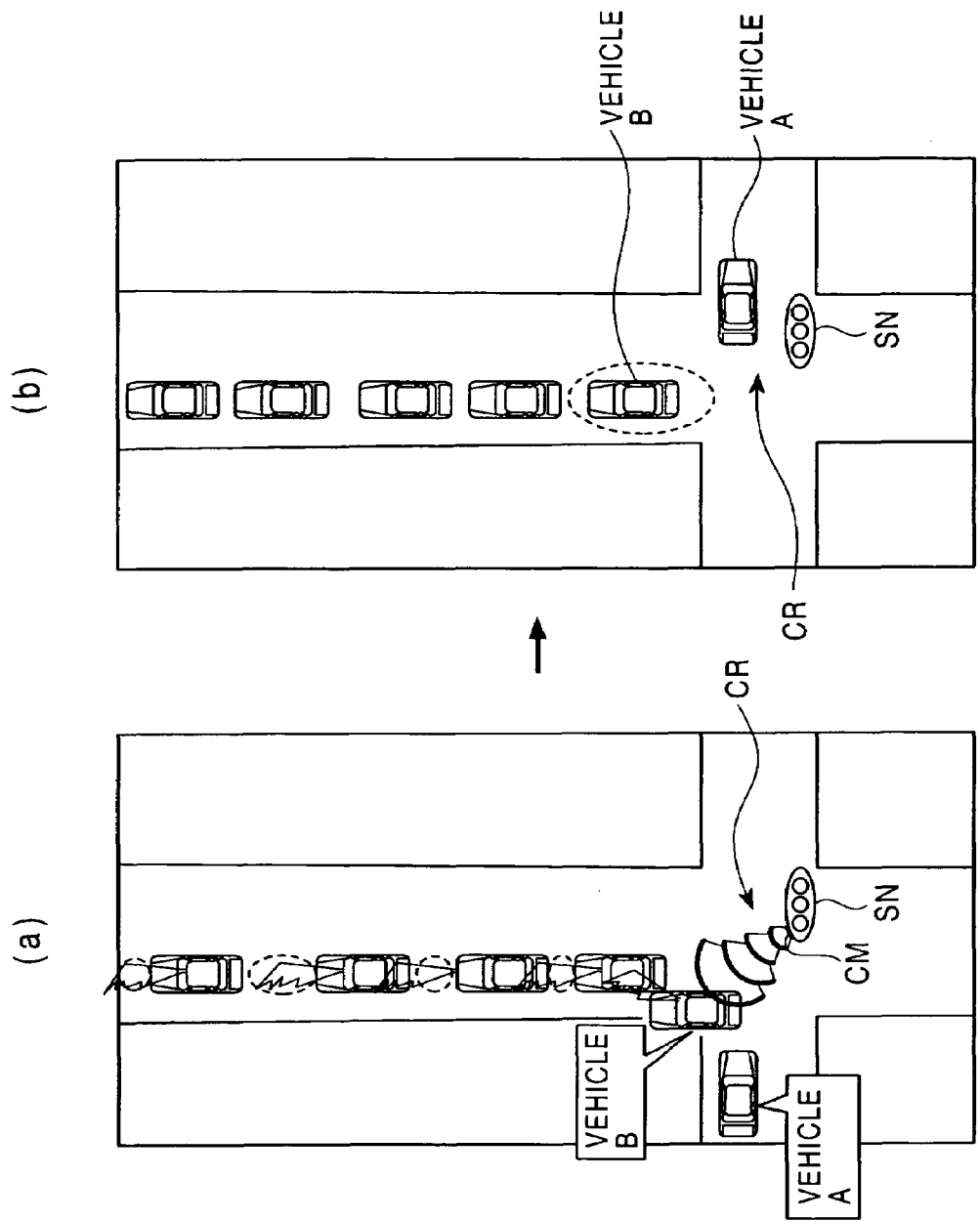
FIG. 9 illustrates how to remove a traffic obstruction.

FIG. 9 illustrates how a vehicle can smoothly get out of an intersection using vehicle-to-vehicle communication to ask other vehicles ahead to move forward, when the vehicle is stuck in the intersection because, for example, the signal has turned red before the vehicle can pass through the intersection due to heavy traffic.

Referring now to FIG. 9(a), vehicle B stuck in an intersection CR is blocking vehicle A. The vehicle-to-vehicle communication apparatus 60 (as shown in FIG. 1) of vehicle B receives, by radio communication, image information (a picture showing how vehicle B is blocking the traffic) acquired by an intersection camera CM installed on a traffic signal SN at the intersection and detects that vehicle B has failed to pass through the intersection based on processing of the image.

In this case, the vehicle-to-vehicle communication apparatus 60 of vehicle B asks for help by using vehicle-to-vehicle communication to transmit a request to remove the traffic obstruction (request to reduce the inter-vehicle distance) together with the described image information received from the described camera CM and a help message such as "Could you move forward slightly?" The vehicles which receive the request and are located between vehicle B and the next intersection form a network for removing the traffic obstruction together with vehicle B.

Figure 10A:
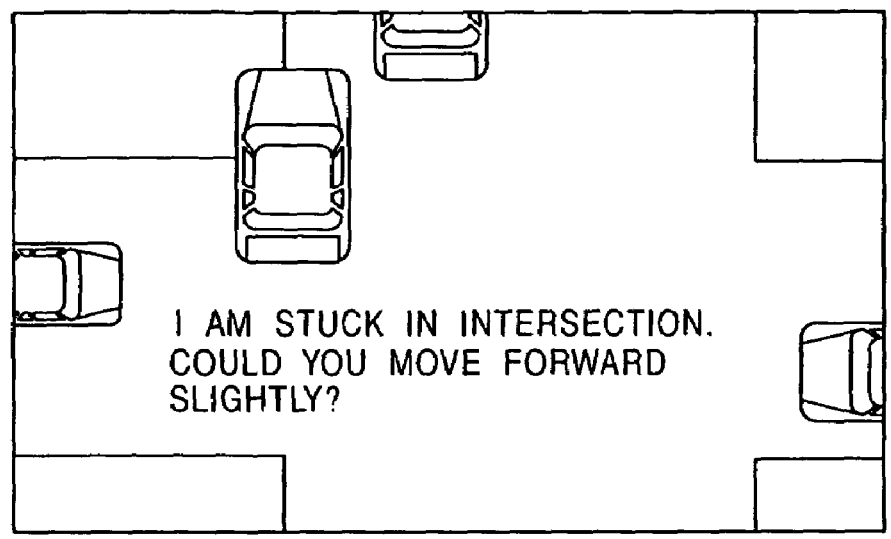
FIGS. 10A and 10B are images acquired to show how vehicle B is blocking the traffic.

Referring to FIG. 10A, the vehicle-to-vehicle communication apparatus 60 of each member of the network for removing the traffic obstruction displays on the display unit 55 of the navigation apparatus 50 (as shown in FIG. 1) how vehicle B is blocking the traffic and the help message, along with a warning sound. The driver of each member in the network is informed that vehicle B is asking for help and sees how vehicle B is in trouble due to the image video. In this state, some members of the network may move forward slightly to create a space for one vehicle, thus helping vehicle B get out of the intersection as shown in FIG. 9(b) to allow vehicle A to pass through the intersection.

In the above embodiment, vehicle B receives an image acquired by the camera installed at the intersection. In another embodiment, vehicle B may be informed by vehicle A that vehicle B is stuck in the intersection.

Figure 10B:
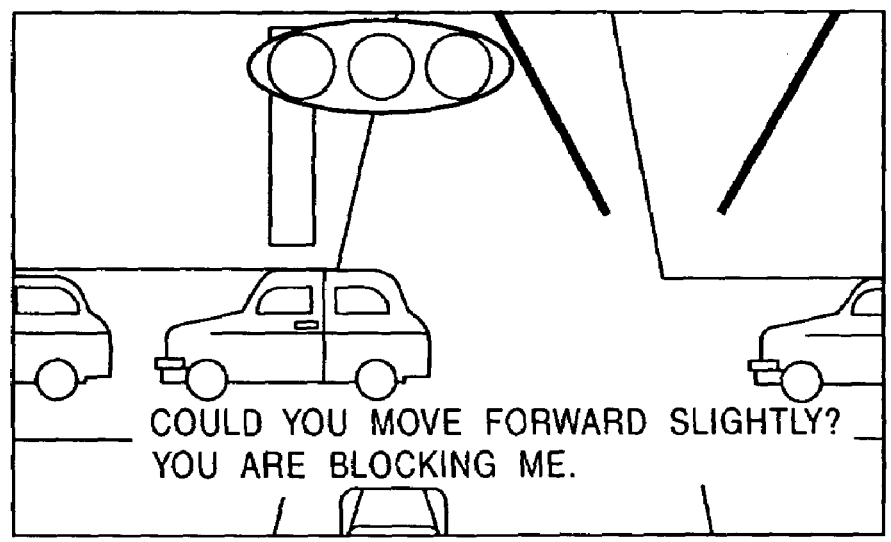
Figure 11:
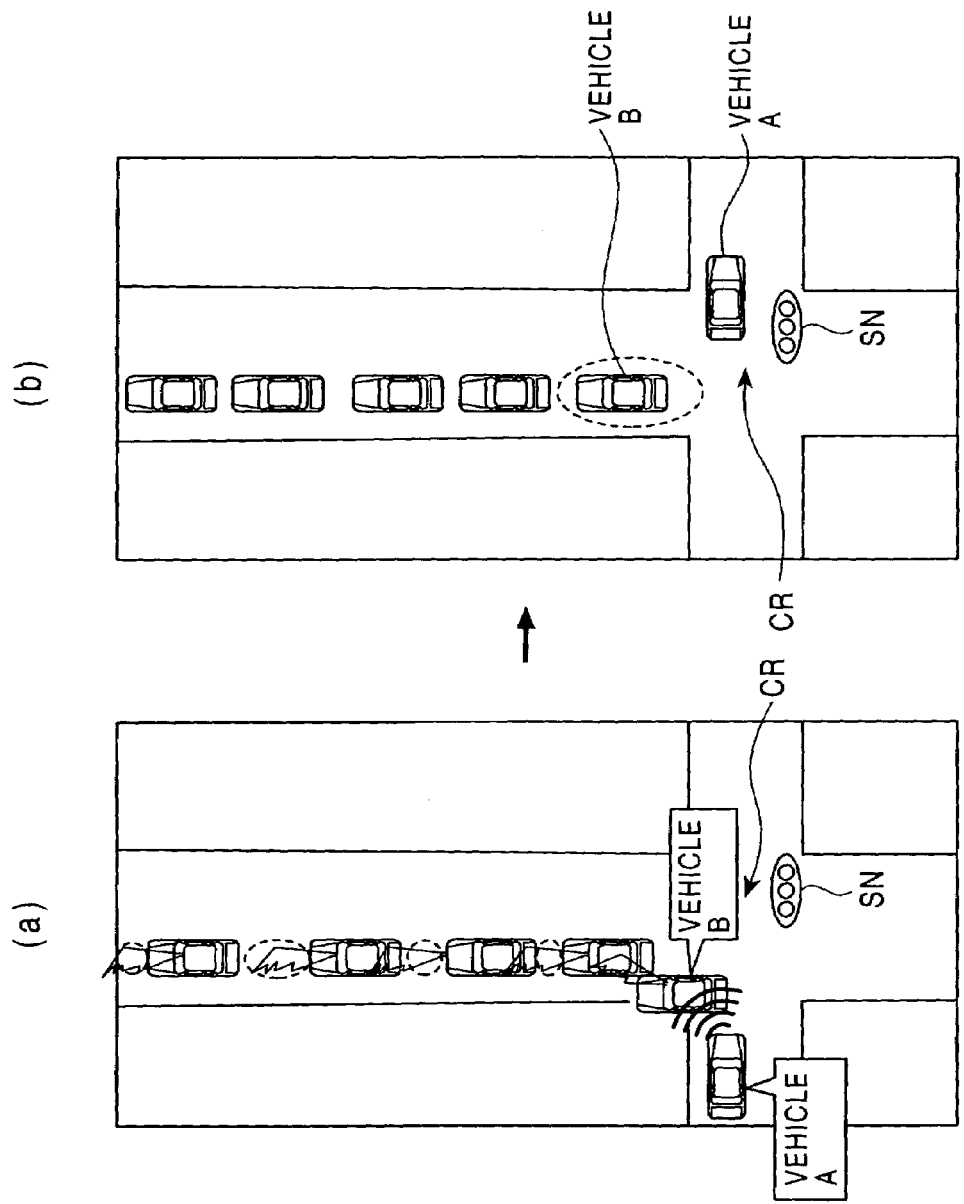
FIG. 11 is another illustration showing how to remove a traffic obstruction.

FIG. 11 illustrates processing for removing the traffic obstruction by vehicle A informing vehicle B that vehicle B is blocking the traffic. Referring now to FIG. 11(a), vehicle B has failed to pass through an intersection CR, blocking vehicle A. In this state, vehicle A may use vehicle-to-vehicle communication to transmit to vehicle B image information (a picture showing how vehicle B is blocking the traffic, as shown in FIG. 10B) acquired by a forward-facing camera installed in vehicle A, along with a warning message such as "Could you move forward slightly?" This causes the display unit 55 of the navigation apparatus 50 (as shown in FIG. 1) of vehicle B to display how vehicle B is blocking the traffic and the warning message, as well as a warning sound.

Referring to FIG. 11, the vehicle-to-vehicle communication apparatus 60 (as shown in FIG. 1) of vehicle B asks for help by using vehicle-to-vehicle communication to transmit a request to remove the traffic obstruction (request to reduce the inter-vehicle distance) together with the described image information received from the camera of vehicle A and the help message "Could you move forward slightly?"

The vehicles that receive the request and are located between vehicle B and the next intersection form a network for removing the traffic obstruction together with vehicle B. The vehicle-to-vehicle communication apparatus 60 of each member of the network for removing the traffic obstruction displays on the display unit 55 of the navigation apparatus 50 how vehicle B is blocking the traffic and the help message, along with a warning sound.

The driver of each member in the network is informed that vehicle B is asking for help and sees how vehicle B is in trouble due to the image video. In this state, some members of the network may move forward slightly to create a space for one vehicle, thus helping vehicle B get out of the intersection, as shown in FIG. 11(b), to allow vehicle A to pass through the intersection.

Figure 12:
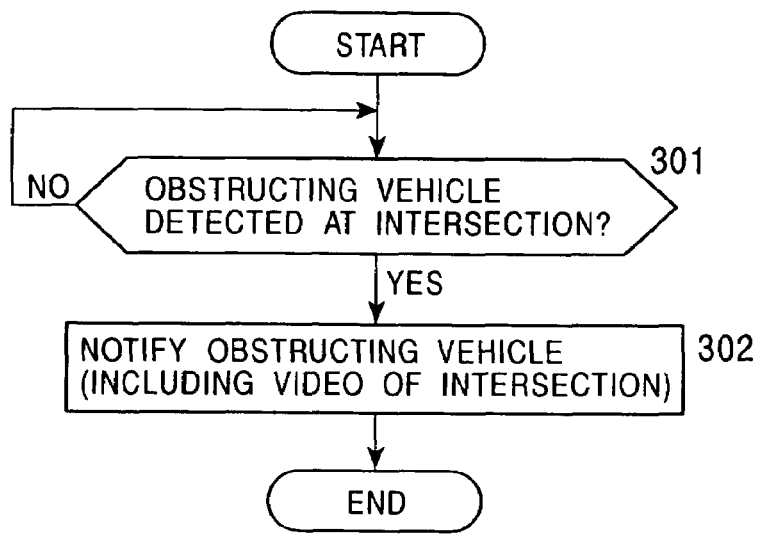
FIG. 12 is a first flowchart of processing for removing a traffic obstruction at the intersection.
Figure 13:
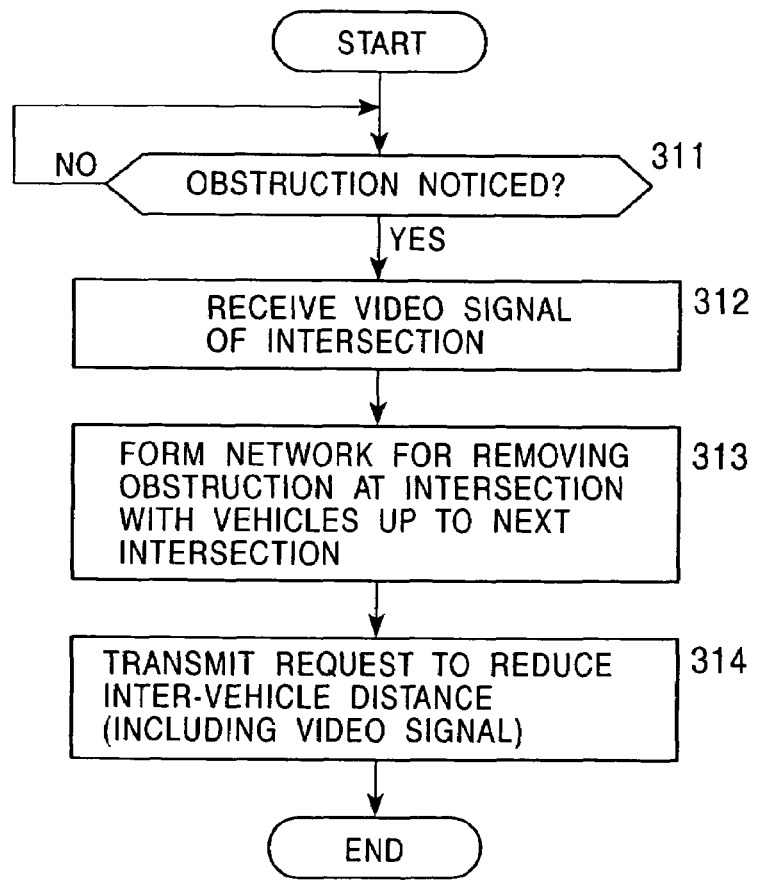
FIG. 13 is a second flowchart of processing for removing a traffic obstruction at the intersection.
Figure 14:
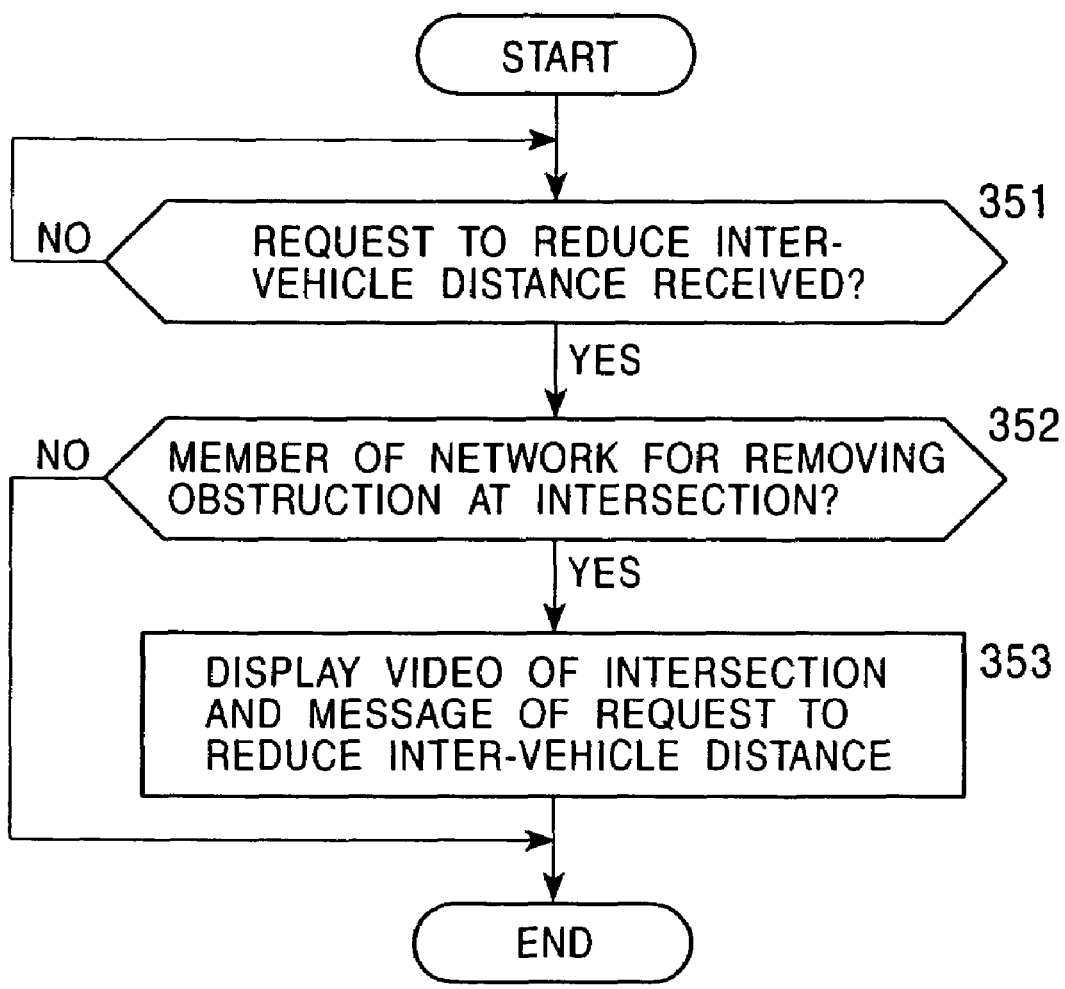
FIG. 14 is a third flowchart of processing for removing a traffic obstruction at the intersection.

FIGS. 12, 13 and 14 are flowcharts of processing for removing the traffic obstruction at the intersection shown in FIG. 11.

Referring to FIGS. 11 and 12, vehicle A detects the obstructing vehicle (vehicle B) at the intersection (act 301) and transmits the image information (a picture showing how vehicle B is blocking the traffic, as shown in FIG. 10B) acquired by the forward-facing camera, together with a warning message such as "Could you move forward slightly?" (act 302). Vehicle A forms a neighboring network with surrounding vehicles including vehicle B, whose Bluetooth device address is known to vehicle A. The format of the message is as shown in FIG. 3A and includes the intersection ID.

Referring now to FIGS. 11 and 13, vehicle B, upon receiving the message from vehicle A, confirms that the ID of the intersection at which vehicle B is located is identical to the intersection ID sent by vehicle A, thus recognizing that vehicle B is blocking the traffic at the intersection (act 311). Then, the vehicle-to-vehicle communication apparatus 60 (as shown in FIG. 1) of vehicle B receives the image information from vehicle A and stores it (act 312). Vehicle B forms a network for removing the traffic obstruction with the communicatable vehicles that are in the same direction as vehicle B and are located up to the next intersection (act 313). Vehicle B then uses vehicle-to-vehicle communication to transmit a signal for a request to remove the traffic obstruction in the format shown in FIG. 3A to the members of the network for removing the traffic obstruction, along with the image information and a help message such as "Could you move forward slightly?" (act 314).

Referring now to FIGS. 11 and 14, the vehicle-to-vehicle communication apparatuses 60 (as shown in FIG. 1) of the vehicles in the network for removing the traffic obstruction, upon receiving the request to remove the traffic obstruction (act 351), refer to the direction data and position information to confirm that they are in the same direction as that of vehicle B and are ahead of vehicle B, i.e., that they are members of the network (act 352). The vehicle-to-vehicle communication apparatus 60 of each member of the network for removing the traffic obstruction displays on the display unit 55 of the navigation apparatus 50 (as shown in FIG. 1) how vehicle B is blocking the traffic and the help message, along with a warning sound (act 353).

(F) Processing for Ensuring Smooth Passage of an Emergency Vehicle

Figure 15:
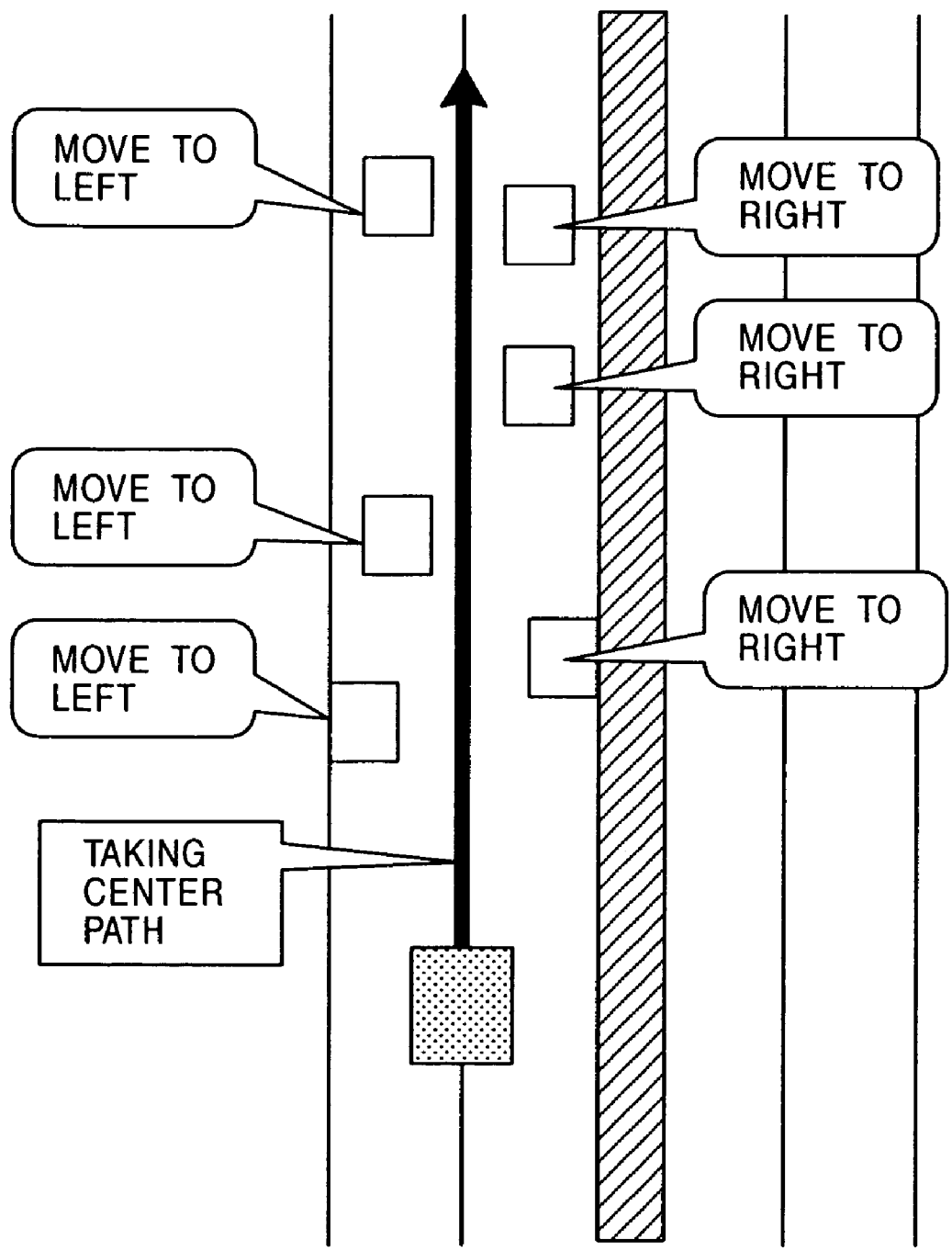
FIG. 15 is a first illustration showing how smooth passage of an emergency vehicle is ensured.
Figure 16:
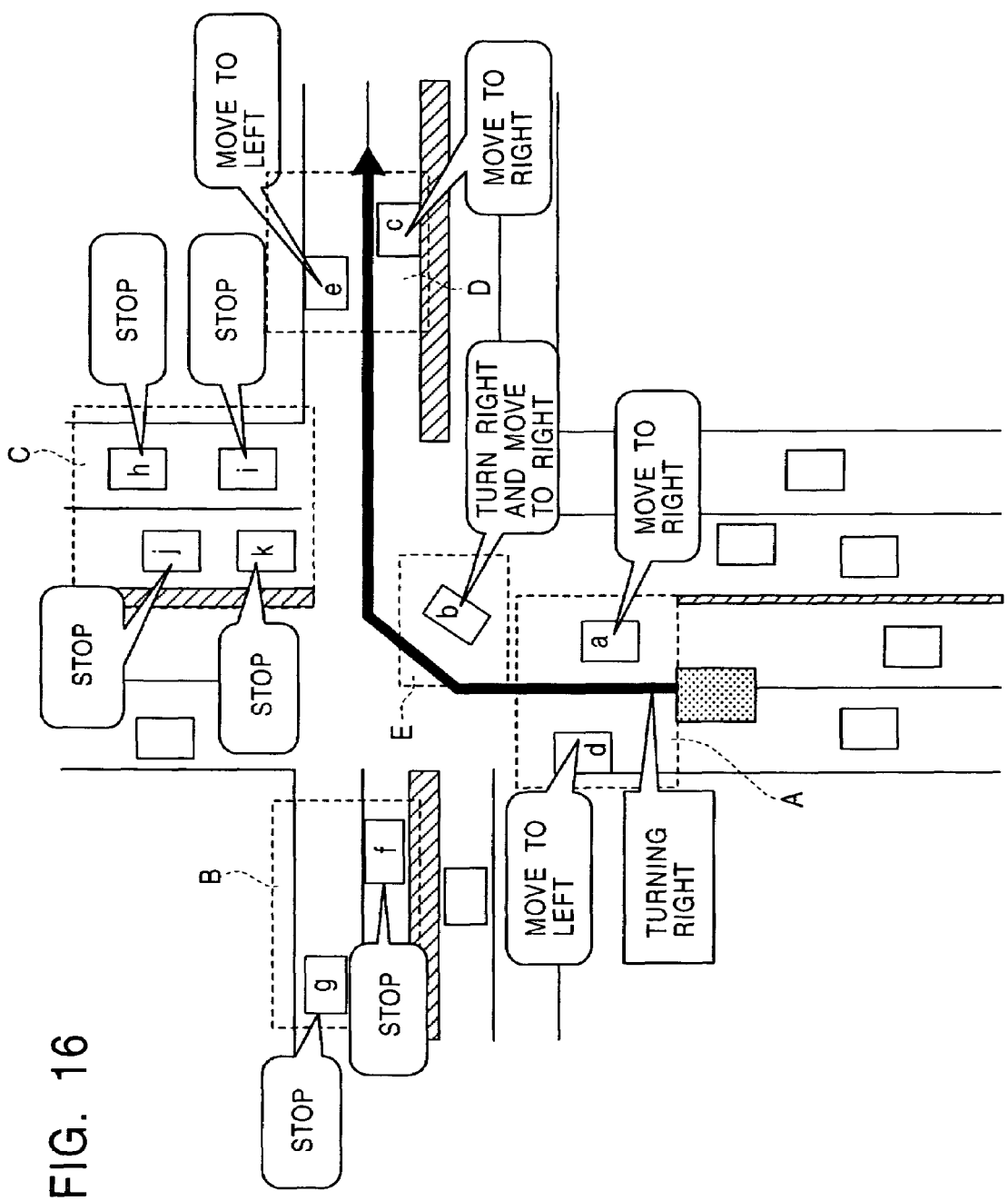
FIG. 16 is a second illustration showing how smooth passage of an emergency vehicle is ensured.

FIGS. 15 and 16 illustrate how smooth passage of an emergency vehicle is ensured.

The emergency vehicle continuously issues the following information regarding itself: the destination, the location, the speed, and the path of the roads the emergency vehicle is to take. The vehicle-to-vehicle communication apparatuses 60 (as shown in FIG. 1) of regular vehicles that have received the above information check whether they are driving in the route of the emergency vehicle, using the information regarding the destination of the emergency vehicle. The regular vehicles driving in the route of the emergency vehicle calculate the distance to the emergency vehicle based on the information regarding the location of the emergency vehicle and the expected time of arrival of the emergency vehicle based on the information regarding the speed of the emergency vehicle. The regular vehicles driving far away from the emergency vehicle display the location of the emergency vehicle and the expected time of arrival of the emergency vehicle until the emergency vehicle reaches a particular distance. When the emergency vehicle reaches a particular distance, the vehicle-to-vehicle communication apparatus 60 of each of the relevant regular vehicles indicates which path in the road the emergency vehicle is to take and instructs its driver, for example, to move to the right or left or to stop depending on whether its vehicle is driving near an intersection or on a straight road.

Referring to FIG. 15 where regular vehicles are driving, for example, on a straight road with two lanes in each direction, the emergency vehicle may issue the message "Taking the center path". Upon receiving the message, the vehicle-to-vehicle communication apparatuses 60 (as shown in FIG. 1) of the regular vehicles driving in the left lane instruct their drivers to move to the left. Upon receiving the message from the emergency vehicle approaching behind, the vehicle-to-vehicle communication apparatuses 60 of the regular vehicles driving in the right lane instruct their drivers to move to the right.

Referring now to FIG. 16 where regular vehicles are near an intersection on a road with two lanes in each direction, the emergency vehicle may issue the message "Turning right". Upon receiving this message, the vehicle-to-vehicle communication apparatuses 60 (as shown in FIG. 1) of the relevant vehicles give their drivers appropriate instructions depending on the locations of the vehicles. Regular vehicles a and d in zone A are instructed to move to the right and left, respectively; vehicles g and f in zone B are instructed to stop; vehicle b in zone E at the center of the intersection is instructed to turn right and then move to the right; vehicles h, i, j, and k in zone C are instructed to stop; and vehicles c and e in zone D are instructed to move to the right and left, respectively.

Figure 17:
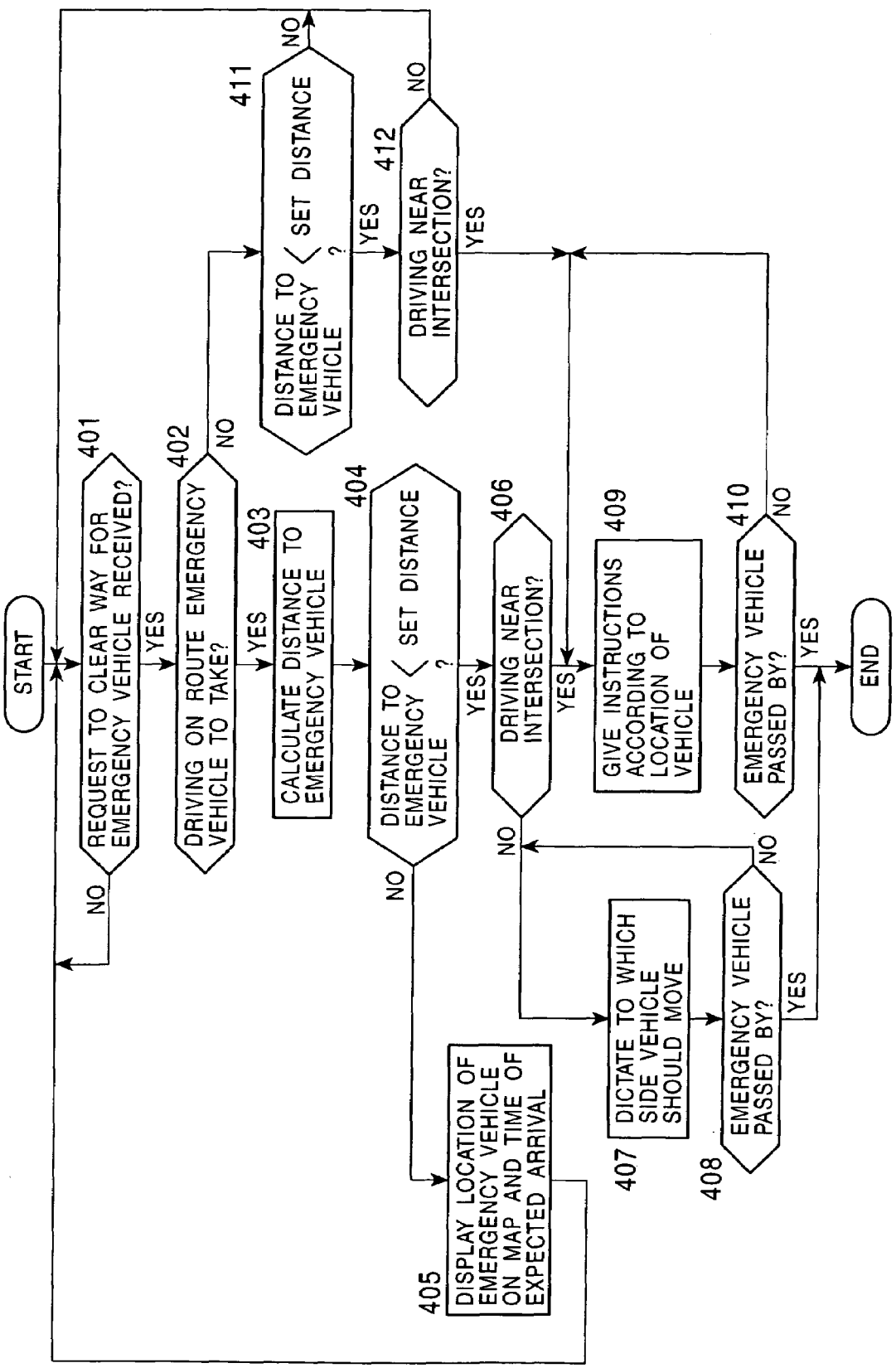
FIG. 17 is a flowchart of processing for ensuring smooth passage of an emergency vehicle.

FIG. 17 is a flowchart for ensuring smooth passage of an emergency vehicle.

Referring to FIG. 17, the vehicle-to-vehicle communication apparatus 60 (as shown in FIG. 1) of a regular vehicle monitors whether a signal for a request to clear the way for an emergency vehicle in the format shown in FIG. 3A has been received (act 401). Upon receiving a signal for a request to clear the way, the vehicle-to-vehicle communication apparatus 60 of the vehicle refers to the information regarding the destination of the emergency vehicle to check whether the vehicle is in the route the emergency vehicle is to take (act 402). The signal for a request to clear the way for an emergency vehicle includes the information regarding the destination, the location, and the speed of the emergency vehicle, as well as the path of the road the emergency vehicle is to take in the communication information field.

If the vehicle is driving on the route the emergency vehicle is to take, its vehicle-to-vehicle communication apparatuses 60 forms with the emergency vehicle a network for smooth passage of the emergency vehicle to calculate the distance to the emergency vehicle (act 403) for checking whether the distance is less than the predetermined value (act 404). If the emergency vehicle is the predetermined distance or more away, the vehicle-to-vehicle communication apparatus 60 of the vehicle identifiably displays the location of the emergency vehicle on the navigation map, calculates and displays the expected time of arrival of the emergency vehicle (act 405), and returns to act 401. When the emergency vehicle comes within the predetermined distance, the vehicle-to-vehicle communication apparatus 60 of the vehicle checks whether the vehicle is located near the intersection where the emergency vehicle is located or on a straight road (act 406). If the vehicle is located on a straight road, the vehicle-to-vehicle communication apparatus 60 dictates to which side the vehicle should move, as shown in FIG. 15 (act 407), waits until the emergency vehicle passes by (act 408), and quits the processing when the emergency vehicle passes by.

If it judges that the vehicle is located near the intersection at act 406, the vehicle-to-vehicle communication apparatus 60 gives its driver appropriate instructions depending on the location of the vehicle, as shown in FIG. 16 (act 409), waits until the emergency vehicle passes by (act 410), and quits the processing when the emergency vehicle passes by.

If it judges that the vehicle is not driving on the route the emergency vehicle is to take at act 402, the vehicle-to-vehicle communication apparatus 60 of the vehicle checks whether the distance to the emergency vehicle is less than the predetermined value (act 411). If the emergency vehicle is not within the predetermined distance, the vehicle-to-vehicle communication apparatus 60 of the relevant vehicle returns to act 401. If the emergency vehicle is within the predetermined distance, the vehicle-to-vehicle communication apparatus 60 checks whether the vehicle is located near the intersection where the emergency vehicle is located (act 412). If the vehicle is not located near the intersection, the vehicle-to-vehicle communication apparatus 60 returns to act 401; if the vehicle is located near the intersection, the vehicle-to-vehicle communication apparatus 60 becomes a member of the network for smooth passage of the emergency vehicle and gives its driver appropriate instructions depending on the location of the vehicle, as shown in FIG. 16 (act 409), waits until the emergency vehicle passes by (act 410), and quits the processing when the emergency vehicle has passed by.

In the processing for ensuring smooth passage of the emergency vehicle, vehicles driving on a straight road ahead of the emergency vehicle; vehicles entering an intersection; and vehicles driving through, in the same direction, the intersection together with the emergency vehicle are required to respond to the request to clear the way for the emergency vehicle. These regular vehicles as described above and an emergency vehicle together form a network for smooth passage of the emergency vehicle.

The present invention has been described above with the aid of examples of embodiments. Therefore, it is understood that the invention is not to be limited to the specific embodiment disclosed, and that various modifications are intended to be included within the scope of the appended claim.

What is claimed is:

1. A method for vehicle-to-vehicle communication between a first vehicle and a second vehicle, the method comprising the acts of:

providing an interrupt point;

providing a first vehicle;

providing a second vehicle, wherein second vehicle is located behind the interrupt point;

providing a vehicle-to-vehicle communication apparatus in the first vehicle and in the second vehicle;

transmitting an interrupt request from the first vehicle to the second vehicle;

forming a network incorporating the first vehicle and the second vehicle;

receiving the interrupt request;

responding to the interrupt request;

automatically flashing an external light on the second vehicle before the interrupt point if the interrupt request is acknowledged; and wherein the interrupt request is a request to enter a road segment, the road segment comprising a first end and a second end and lacking sufficient width to accommodate two directions of traffic, in which the first vehicle seeks to travel from the first end to the second end and the second vehicle seeks to travel from the second end to the first end.

2. The method of claim 1, wherein the vehicle-to-vehicle communication apparatus is connected to a navigation apparatus via an interface.

3. The method of claim 1, further comprising the act of displaying the interrupt request and a positional relationship between the first vehicle and the second vehicle in the second vehicle.

4. The method of claim 1, further comprising the act of displaying acknowledgement of the interrupt request and data for identifying the second vehicle in the first vehicle.

5. A vehicle-to-vehicle communication apparatus for communication between a first vehicle and a second vehicle, the apparatus comprising:
   a communication unit operable to transmit a request from a first vehicle to a second vehicle and receive another request from the second vehicle to the first vehicle; and
   a vehicle-to-vehicle control unit operable to form a pre-determined network with the second vehicle and respond to the request after the communication unit receives the request from the second vehicle;
   an automatic flashing unit operable to instruct an external light on the first vehicle to flash before an interrupt point if the request is acknowledged;
   wherein the communication unit is operable to receive a request to interrupt sent from the first vehicle to the second vehicle on a main road when the second vehicle being located behind an interrupt point; and
   wherein the request to interrupt is a request to enter a road segment, the road segment comprising a first end and a second end and lacking sufficient width to accommodate two directions of traffic, in which the first vehicle seeks to travel from the first end to the second end and the second vehicle seeks to travel from the second end to the first end.

6. The vehicle-to-vehicle communication apparatus of claim 5, wherein the apparatus of the second vehicle is operable to display the received interrupt request and a positional relationship between the first vehicle and the second vehicle on a display unit.

7. The vehicle-to-vehicle communication apparatus of claim 6, wherein the display unit is located in a navigation apparatus connected to the vehicle-to-vehicle communication apparatus via an interface.

8. The vehicle-to-vehicle communication apparatus of claim 7, wherein the vehicle-to-vehicle control unit of the first vehicle is operable to display acknowledgement of the interrupt request and data for identifying the second vehicle on the display unit.

9. A method for vehicle-to-vehicle communication between a first vehicle and a second vehicle, the method comprising the acts of:
   providing an interrupt point;
   providing a first vehicle;
   providing a second vehicle, wherein second vehicle is located behind the interrupt point;
   providing a vehicle-to-vehicle communication apparatus in the first vehicle and in the second vehicle;
   transmitting an interrupt request from the first vehicle to the second vehicle;
   forming a network incorporating the first vehicle and the second vehicle;
   receiving the interrupt request; and
   responding to the interrupt request;
   wherein the interrupt request is a request to enter a road segment, the road segment comprising a first end and a second end and lacking sufficient width to accommodate two directions of traffic, in which the first vehicle seeks to travel from the first end to the second end and the second vehicle seeks to travel from the second end to the first end.

10. The method of claim 9 further comprising the act of automatically flashing an external light on the second vehicle before the interrupt point if the interrupt request is acknowledged.

11. The method of claim 9, wherein the vehicle-to-vehicle communication apparatus is connected to a navigation apparatus via an interface.

12. The method of claim 9, further comprising the act of displaying the interrupt request and a positional relationship between the first vehicle and the second vehicle in the second vehicle.

13. The method of claim 9, further comprising the act of displaying acknowledgement of the interrupt request and data for identifying the second vehicle in the first vehicle.

14. A vehicle-to-vehicle communication apparatus for communication between a first vehicle and a second vehicle, the apparatus comprising:
   a communication unit operable to transmit a request from a first vehicle to a second vehicle and receive another request from the second vehicle to the first vehicle; and
   a vehicle-to-vehicle control unit operable to form a pre-determined network with the second vehicle and respond to the request after the communication unit receives the request from the second vehicle;
   wherein the communication unit is operable to receive a request to interrupt sent from the first vehicle to the second vehicle on a main road when the second vehicle being located behind an interrupt point; and
   wherein the request to interrupt is a request to enter a road segment, the road segment comprising a first end and a second end and lacking sufficient width to accommodate two directions of traffic, in which the first vehicle seeks to travel from the first end to the second end and the second vehicle seeks to travel from the second end to the first end.

15. The vehicle-to-vehicle communication apparatus of claim 14, wherein the apparatus of the second vehicle is operable to display the received interrupt request and a positional relationship between the first vehicle and the second vehicle on a display unit—and wherein the apparatus of the second vehicle, if acknowledging the interrupt request, automatically flashes a light using an automatic light-flashing unit immediately before the interrupt point.

16. The vehicle-to-vehicle communication apparatus of claim 14, wherein the display unit is located in a navigation apparatus connected to the vehicle-to-vehicle communication apparatus via an interface.

17. The vehicle-to-vehicle communication apparatus of claim 14, wherein the vehicle-to-vehicle control unit of the first vehicle is operable to display acknowledgement of the interrupt request and data for identifying the second vehicle on the display unit.

* * * * *